Sept. 26, 1950          C. O. FELL          2,523,615
DROPPINGS PAN FOR POULTRY HOUSING
Filed Feb. 18, 1946          2 Sheets-Sheet 2
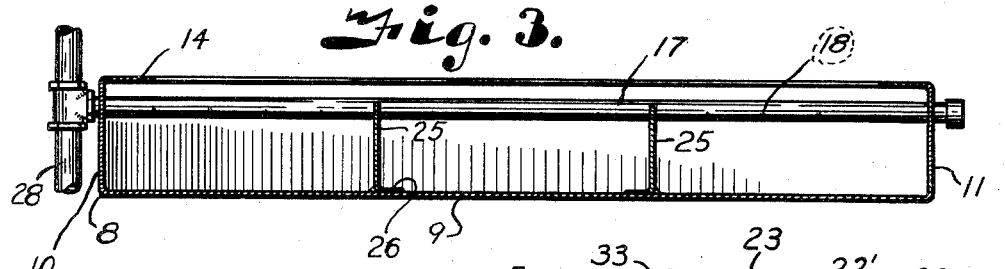
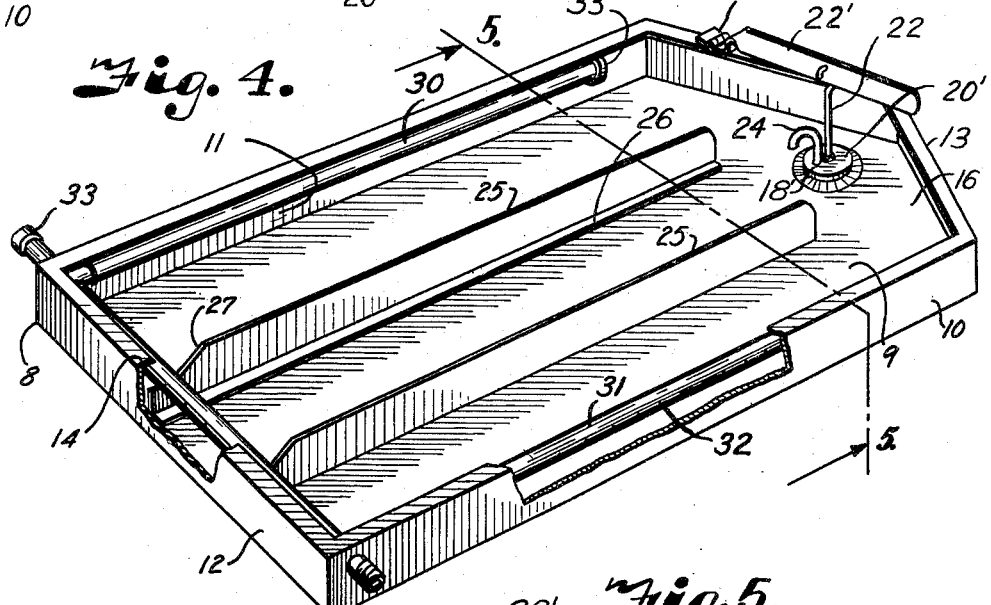
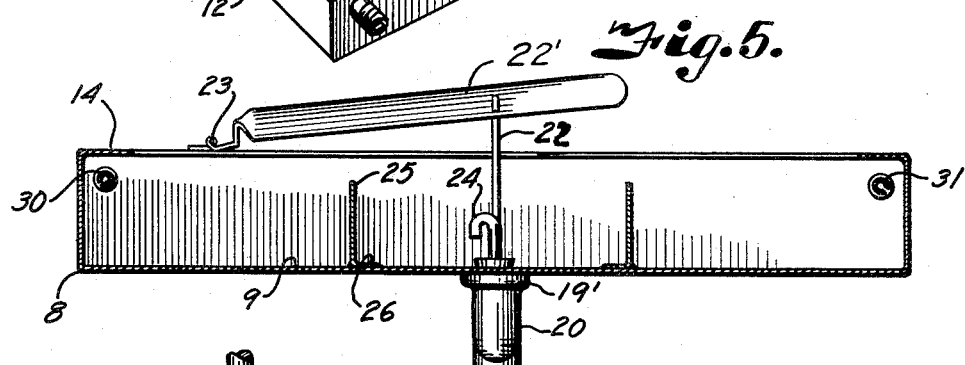
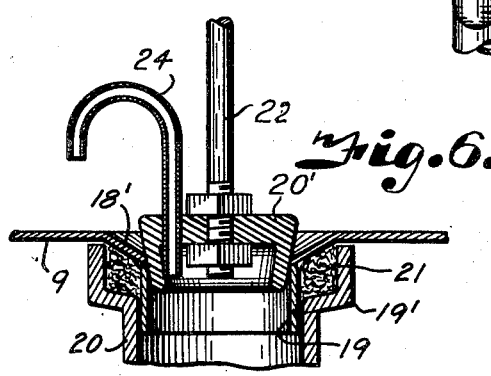
INVENTOR.
CLARENCE O. FELL
BY
Fishburn & Mullendore,
ATTORNEYS

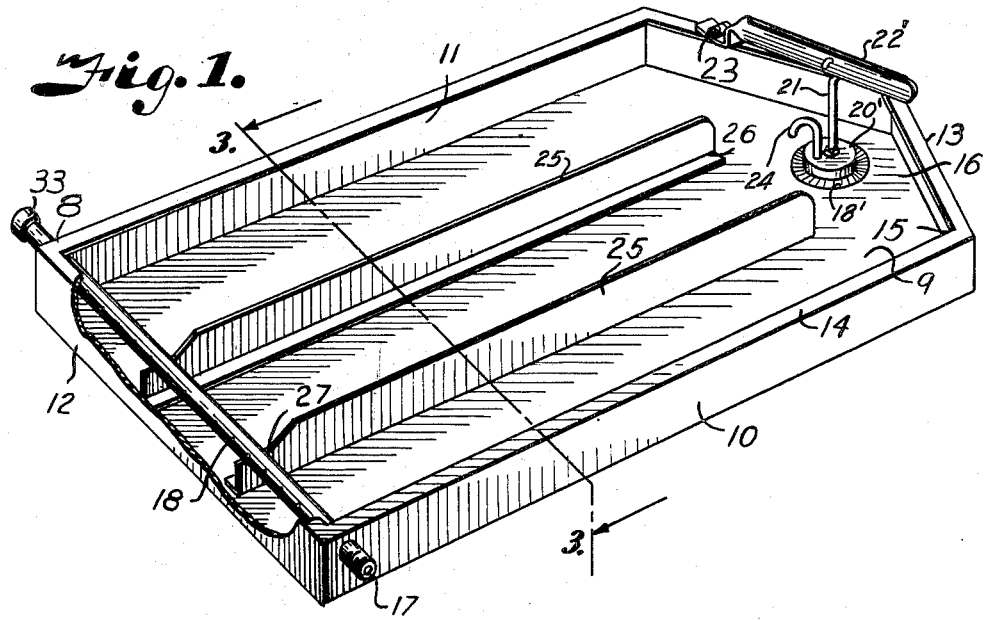

Patented Sept. 26, 1950

2,523,615

UNITED STATES PATENT OFFICE 2,523,615

DROPPINGS PAN FOR POULTRY HOUSING

Clarence O. Fell, Kansas City, Mo.

Application February 18, 1946, Serial No. 648,337

2 Claims. (Cl. 119—22)

This invention relates to a droppings pan for use in poultry housing battery units for raising various fowls or poultry, particularly chickens, pigeons and the like, and more particularly to an improved pan for catching the excrements from the poultry and removing such excrements from the pan by flushing with a fluid medium such as water.

Heretofore various types of apparatus have been designed for catching the droppings or excrements from poultry housed in batteries, usually having a plurality of tiers or decks with wire or fabricated floors for containing the poultry, and various mechanical means having been used for removing the excrements from the pans and disposing of the same outside the poultry house for ultimate disposal elsewhere. It is, of course, very necessary that the atmosphere and surroundings of the chickens be sanitary to prevent disease of the poultry housed in the battery.

The principal objects of the present invention are to provide a droppings pan for use beneath the wire or fabricated floor of a battery unit which may be quickly and easily cleaned; to provide a droppings pan adapted to be located beneath the floor of the respective battery housings and provided with a hook-up to a water system for flushing the excrements from the pan; to provide a pan of this character having means for preventing the excrements from piling up in the pan; to provide means for accumulating water in the pan to obtain a supply therein for soaking the excrements and keeping them wet to prevent their becoming dry and hard to dislocate; and to provide a device of this character simple, economical to manufacture and efficient in operation.

In accomplishing these and other objects of the present invention, I have provided improved details of structure, the preferred form of which is illustrated in the accompanying drawings wherein:

Fig. 1 is a perspective view of my droppings pan, with parts broken away to better illustrate the invention.

Fig. 2 is a side view of a plurality of the pans shown connected in a battery system and to a water supply, with parts broken away to better illustrate the invention.

Fig. 3 is a transverse sectional view through the pan on the line 3—3, Fig. 1.

Fig. 4 is a perspective view of a modified form of the pan with parts broken away to illustrate the perforated water pipes.

Fig. 5 is a transverse sectional view on the line 5—5, Fig. 4, particularly illustrating the disposal pipe and the plug therefor.

Fig. 6 is an elevational cross section of the stopper and disposal pipe.

Referring more in detail to the drawings:

1 designates a battery or the like having a plurality of decks or housings provided with floors 2, 3 and 4, the decks being one above the other and the floors being of wire netting or the like to allow the droppings from the chickens housed in the compartments to pass therethrough as in conventional practice. The decks are supported by standards 5, 6 and 7 as is also the usual practice. My present invention contemplates the use of pans for collecting droppings from the chickens housed in the compartments, the pans being located beneath the perforated flooring of the compartments and adapted to be supported by the upright standards 5, 6 and 7, as best illustrated in Fig. 2.

8 designates a pan embodying the features of my invention having a bottom 9, side walls 10 and 11, and end walls 12 and 13, the side and end walls being turned inwardly to form a flange 14 around the top of the pan to prevent flushing fluid from slopping out of the pan as will later be described.

I have here shown the main body of the pan to be substantially rectangular in form, the end 13 of the pan being adapted to extend beyond the substantially rectangular portion of the pan as indicated at 15 to provide a portion 16 extending beyond the battery as best illustrated in Fig. 2. While I have here shown the end 13 to be of substantially V-shape, any form of end portion may be provided. The bottom 9 of the pan slopes slightly from the end 12 toward the end 13 to allow the flushing fluid to drain from the pan.

The side walls 10 and 11 of the pan are provided with openings near the end 12 adapted to receive a pipe 17 for supplying a flushing medium, such as water, to the pan for removing the droppings therefrom. The pipe 17 is provided with perforations 18 and as here shown, the perforations extend toward the end 12 so that the water will strike against the end 12 of the pan and be deflected to the bottom thereof to provide a spray over the entire surface of the bottom of the pan and prevent slopping of the water upwardly from the bottom of the pan onto the poultry in the battery. It will be obvious that the perforated pipe may be turned so that the water will be delivered to the pan at various angles.

The extension of the pan is provided with an outlet 18' having a depending flange 19 adapted to engage in a flanged end 19' of a pipe 20. The outlet is provided with a stopper 20' which may be of a resilient material, such as rubber or the like. The flange portion 19' is provided with a suitable packing 21 to prevent leakage between the pan and pipe. With this arrangement the pan is readily removable from the pipe when desired. Attached to the stopper 20' in any suitable manner is a hook 22 adapted to engage a lever 22' pivotally secured to the flange 14 of the end 13 by a hinge or the like 23 for removing the stopper from the outlet when desired. The stopper is also provided with an overflow pipe 24 for a purpose later described.

Located on the bottom 9 of the pan longitudinally thereof are upstanding ribs 25. I have here shown two of these ribs, although any suitable number may be used. The ribs have a lateral flange member 26 which may be welded or otherwise secured to the bottom of the pan. One end of the ribs is cut away as indicated at 27 to accommodate the water pipe 17. The opposite ends stop short of the extension 16 of the end 13 which extends outwardly from the battery.

Assuming the pan to be supported in the battery as illustrated in Fig. 2 and connected to a water supply system 28 having a valve 29, operation of the device is as follows:

The stopper 20' is inserted in the outlet of the pan and water is supplied through the pipe 28 by manipulating the valve 29 so that water will accumulate in the bottom of the pan as indicated at A, Fig. 2, the water keeping the droppings from drying and sticking to the bottom of the pan and the overflow pipe 24 preventing overflow of the pan. When it is desired to clean the droppings from the pan, the stopper is removed by raising lever 22' and the water turned on by manipulating valve 29. The water will enter pipe 17 and be emitted therefrom through the perforations 18 against the inside of the end wall 12 and be directed thereby against the bottom 9 of the pan to provide a substantially continuous sheet of water over the entire surface of the bottom of the pan, thus washing the droppings through the outlet pipe 19 to a place of deposit (not shown). The ribs 25 will tend to prevent rivulets from forming in the droppings in the pan or piling up of the droppings in one place so that they will all be removed from the pan.

If desired, the pans may be used without an accumulation of water in the bottom thereof.

In Figs. 4 and 5 I have shown pipes 30 and 31 connected to pipe 17 and extending longitudinally along substantially the entire sides 10 and 11 of the pan underneath the inturned flange 14 having perforations as indicated at 32 to direct water against the inner sides of the side walls to provide a spray from both sides of the pan as well as the end to increase the turbulence of the spray if desired. The ends of the pipes are provided with caps 33 as is the usual practice.

It will be obvious from the foregoing that I have provided an improved droppings pan for poultry batteries and the like and means for cleaning the droppings therefrom by flushing the same with water or other fluid.

What I claim and desire to secure by Letters Patent is:

1. A device for collecting droppings from poultry retained in an enclosure, comprising, a pan having a sloping bottom and an outlet in said bottom, a liquid supply system connected to said pan, said system including a perforated pipe extending along one end of the pan for flushing the droppings from the pan through said outlet, a plurality of relatively high upstanding laterally spaced ribs extending longitudinally of the pan from the end having the perforated pipe and terminating short of the end adjacent the outlet, a stopper for said outlet for retaining the flushing liquid in the pan to soften the droppings before flushing the pan, a lever pivotally mounted on the pan and having connection with the stopper for removing the stopper from the outlet, and an overflow pipe in said stopper, said overflow pipe having an inlet spaced vertically from the stopper to control the level of liquid in the pan.

2. In a poultry battery system, a housing for containing poultry, a pan adapted to be supported beneath said housing for collecting excrements therefrom, a water supply system connected to said pan including a perforated pipe in one end thereof, the bottom of the pan sloping slightly to the opposite end thereof, said latter end having an extension extending outside the housing for the poultry and having an opening in the bottom thereof for passage of the excrements and water from the pan, means for selectively maintaining a level of water in the pan, and a plurality of relatively high upstanding laterally spaced ribs extending longitudinally of the pan from the end having the perforated pipe and terminating at the end of the housing adjacent the pan extension for preventing channeling of the flow of water around the excrements on the bottom of the pan.

CLARENCE O. FELL.

REFERENCES CITED

The following references are of record in the file of this patent:

UNITED STATES PATENTS

| Number | Name | Date |
| --- | --- | --- |
| 93,258 | Whiteley | Aug. 3, 1869 |
| 755,109 | Bussenius | Mar. 22, 1904 |
| 1,125,597 | Roegner | Jan. 19, 1915 |
| 1,995,238 | Bisher | Mar. 19, 1935 |
| 2,065,347 | Schulse | Dec. 22, 1936 |
| 2,122,245 | Callahan | June 28, 1938 |
| 2,309,458 | Ingraham | Jan. 26, 1943 |